United States Patent
Tseng (10) Patent No.: US 9,695,852 B2
(45) Date of Patent: Jul. 4, 2017

(54) FLOATING FASTENER MOUNTING STRUCTURE

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 96 days.

(21) Appl. No.: 14/750,630

(22) Filed: Jun. 25, 2015

(65) Prior Publication Data

US 2015/0292539 A1    Oct. 15, 2015

Related U.S. Application Data

(63) Continuation-in-part of application No. 14/716,218, filed on May 19, 2015, which is a continuation-in-part of application No. 14/614,983, filed on Feb. 5, 2015, now Pat. No. 9,347,471, which is a continuation of application No. 13/607,759, filed on Sep. 9, 2012, now abandoned.

(51) Int. Cl.
F16B 39/00    (2006.01)
F16B 5/02     (2006.01)

(52) U.S. Cl.
CPC ....... F16B 5/0208 (2013.01); *Y10T 29/49948* (2015.01)

(58) Field of Classification Search
CPC .................................................... F16B 5/0208
USPC ................................................. 411/107, 353
See application file for complete search history.

(56) References Cited

U.S. PATENT DOCUMENTS

| 3,180,389 A |   | 4/1965  | Frank |
|-------------|---|---------|-------|
| 4,616,967 A | * | 10/1986 | Molina ................. F16B 41/002 411/105 |
| 5,251,370 A |   | 10/1993 | Muller et al. |
| 5,335,411 A |   | 8/1994  | Muller et al. |
| 5,382,124 A |   | 1/1995  | Frattarola |
| 5,544,992 A | * | 8/1996  | Ciobanu .............. H05K 7/1407 411/107 |

(Continued)

*Primary Examiner* — Gary Estremsky
(74) *Attorney, Agent, or Firm* — Muncy, Geissler, Olds & Lowe, P.C.

(57) ABSTRACT

A floating fastener mounting structure includes a mounting socket having an annular bottom stop flange and mounting portion extending around a bottom end of a center hole thereof, a locking member including a shank inserted through center hole, a mounting head located at the top end of shank and suspending above center hole and an expanded locking end tip located at the bottom end of shank and movable in and out of the bottom end of center hole, a spring member mounted around shank and stopped between mounting socket and locking member, a cap member fastened to mounting head and having an outer diameter not larger than outer diameter of annular bottom stop flange and defining an accommodation chamber for accommodating a part of the mounting socket and a part of the mounting head. The mounting portion is downwardly inserted into a mounting through hole, and then a stamping process is applied to deform the peripheral wall of mounting through hole into a riveting portion and to simultaneously force riveting portion into engagement with the mounting portion tightly.

8 Claims, 11 Drawing Sheets

(56) References Cited

U.S. PATENT DOCUMENTS

| | | | |
|---|---|---|---|
| 5,586,852 A * | 12/1996 | Ganter | F16B 21/12 411/349 |
| 5,851,095 A | 12/1998 | Ellis et al. | |
| 6,238,155 B1 | 5/2001 | Aukzemas et al. | |
| 6,280,131 B1 | 8/2001 | Ellis et al. | |
| 6,468,012 B2 | 10/2002 | Ellis et al. | |
| 6,722,052 B2 | 4/2004 | Wu | |
| 7,905,696 B2 * | 3/2011 | Chiu | F16B 5/0208 411/107 |
| 7,938,607 B2 * | 5/2011 | Wang | F16B 5/0208 411/107 |
| 8,066,461 B2 | 11/2011 | Travers | |
| 8,087,861 B2 | 1/2012 | Wang | |
| 8,371,786 B2 | 2/2013 | Chiu | |
| 8,388,288 B2 | 3/2013 | Chiu | |
| 8,827,614 B2 | 9/2014 | Tseng | |
| 2006/0137166 A1 | 6/2006 | Babej et al. | |
| 2010/0290861 A1 | 11/2010 | Wang | |
| 2011/0302759 A1 | 12/2011 | Chiu | |
| 2011/0308065 A1 | 12/2011 | Wang | |
| 2012/0224935 A1 | 9/2012 | Chiu | |
| 2012/0237315 A1 | 9/2012 | Chiu | |
| 2012/0237316 A1 | 9/2012 | Chiu | |

\* cited by examiner

FLOATING FASTENER MOUNTING STRUCTURE

This application is a Continuation-In-Part of co-pending application Ser. No. 14/716,218, filed on May 19, 2015, which is a Continuation-In-Part of co-pending application Ser. No. 14/614,983, filed on Feb. 5, 2015; and this application is a Continuation of application Ser. No. 13/607,759, filed on Sep. 9, 2012; for which priority is claimed under 35 U.S.C. §120, the entire contents of which are hereby incorporated by reference.

BACKGROUND OF THE INVENTION

1. Field of the Invention

The present invention relates to floating fastener mounting technology and more particularly, to a floating fastener mounting structure, wherein the floating fastener is fastened to the metal panel member in a direction from the top side toward the bottom side, enabling the bottom mounting portion of the mounting socket of the floating fastener to be affixed to the mounting through hole of the metal panel member through a stamping process; the locking member that is inserted through the mounting socket for locking the metal panel member to an external metal panel member has an elastic cushion member mounted at the bottom side of the expanded locking end tip for protection, avoiding the locking member from damaging the surface of the metal panel member during operation.

2. Description of the Related Art

When joining metal panel members, fastening devices respectively formed of a lock screw, a rotary knob and a washer may be used. During application, the lock screw, rotary knob and washer of each fastening device are assembled and then mounted at a first metal panel member. When fastening the first metal panel member to a second metal panel member, rotate the rotary knob of each fastening device to drive the respective lock screw into a respective mounting screw hole at the second metal panel member, and then use a hand tool to fasten tight the lock screw. This multiple metal panel member fastening method can be used in a machine tool or other situations where multiple metal panel members are to be fastened in a stack. In a machine tool, the location where metal panel members are fastened together may be at the power drive or speed-adjustment unit inside the housing. The lock screws of the fastening devices may fall from the metal panel members and missed easily due to user's negligence during a metal panel member dismounting procedure for the performance of a repair or speed adjustment operation, affecting further re-installation operation.

Figure 11:
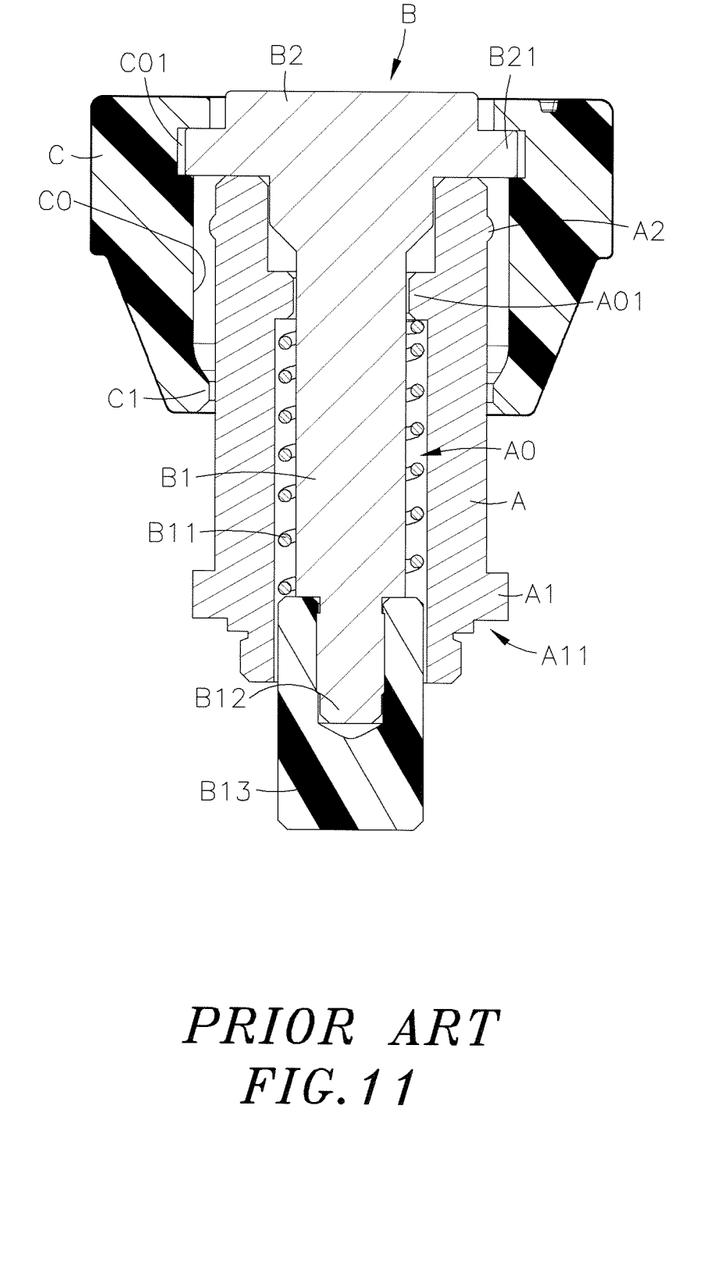
FIG. 11 is a sectional assembly view of a floating fastener according to the prior art.

In order to eliminate the aforesaid problem, floating fasteners formed of a cap member, a locking screw, a spring member and a mounting socket are created. In application, the mounting socket is affixed to a metal panel member; the locking screw is inserted through the mounting socket; the spring member is mounted around the locking screw and stopped between the head of the locking screw and an inside wall of the mounting socket; the cap member is affixed to the head of the locking member and axially slidably coupled to the mounting socket. For example, FIG. 11 illustrates a floating fastener according to the prior art. According to this design, the floating fastener comprises a mounting socket A comprising a center opening A0, an annular locating flange A1 extending around the periphery thereof near the bottom, a mounting portion A11 located at the bottom side of the annular locating flange A1, a raised annular portion A2 extending around the periphery thereof near the top, an inside annular stop flange A01 suspending in the center opening A0 near the top, a locking member B comprising a shank B1 inserted through the center opening A0 of the mounting socket A, a locking tip B13, a connecting portion B12 connected between the bottom end of the shank B1 and the locking tip B13, a head B2 located at the opposing top end of the shank B1 and a mounting flange B21 extending around the periphery of the head B2 and stoppable above the mounting socket A, a spring member B11 mounted around the shank B1 with the opposite top and bottom ends thereof respectively stopped against the inside annular stop flange A01 of the mounting socket A, and a cap member C affixed to the mounting flange B21 of the locking member B and slidably coupled to the mounting socket A. The cap member C comprises an accommodation chamber C0 for receiving an upper part of the mounting socket A around the raised annular portion A2, a mounting groove C01 located in a top side inside the accommodation chamber C0 and engaged with the mounting flange B21 of the locking member B, an inner bearing flange C1 inwardly curved from a bottom end thereof around the accommodation chamber C0 and suspending around the periphery of the mounting socket A below the raised annular portion A2 and stoppable below the raised annular portion A2 to prohibit the cap member C from falling out of the mounting socket A. Thus, the locking member B is movable with the cap member C relative to the mounting socket A to carry the locking tip B13 in and out of the mounting socket A for locking a first metal panel member to which the mounting socket A is affixed to a second metal panel member, or unlocking the first metal panel member from the second metal panel member. When pushing the locking tip B13 out of the mounting socket A for locking the first metal panel member to the second metal panel member, the locking tip B13 can touch and rub against the surface of the second metal panel member, damaging the surface of the second metal panel member. Accidental impact between the locking tip B13 and the second metal panel member can cause deviation of the locking tip B13. When this problem occurs, the locking tip B13 will not be able to be accurately and smoothly inserted into the mounting through hole of the second metal panel member.

Further, according to the aforesaid prior art design, the cap member C is fastened to the locking member B around the head B2, increasing the width and thickness of the head B2 and complicating the machining of the locking member B. Further, prior to fastening the mounting flange B21 of the locking member B to the mounting groove C01 the cap member C, the shank B1 of the locking member B must be inserted through the center opening A0 of the mounting socket A to keep the head B2 of the locking member B above the mounting socket A, complicating the mounting operation and wasting much labor and time. Further, the cap member C is capped around the top of the mounting socket A with the inner bearing flange C1 kept apart from the periphery of the mounting socket A and stoppable below the raised annular portion A2. Thus, the cap member C must have a certain length size, complicating the fabrication.

Therefore, there is a strong demand for a floating fastener mounting structure that prevents accidental impact between the locking tip of the locking member and the metal panel member to cause a surface damage, and facilitates mounting between the head of the locking member and the cap member.

SUMMARY OF THE INVENTION

The present invention has been accomplished under the circumstances in view. It is therefore the main object of the present invention to provide a floating fastener mounting structure, which enables the mounting socket to be installed in the mounting through hole of the metal panel member in a direction from the top side toward the bottom side, so that the bottom mounting portion of the mounting socket can provide a large contact surface area with the metal panel member for protection against the transverse shearing force that is produced during pulling or pushing of the locking member and the cap member in the vertical direction.

According to one aspect of the present invention, the floating fastener mounting structure comprises a mounting socket that comprises a center hole, an annular bottom stop flange and a mounting portion located at a bottom side of the annular bottom stop flange around center hole, a locking member that comprises a shank inserted through the center hole of the mounting socket, a mounting head axially upwardly extended from a top end of the shank and suspending above the mounting socket and an expanded locking end tip axially downwardly extended from an opposing bottom end of the shank, a spring member mounted around the shank and stopped between a part of the mounting socket and a part of the locking member, a cap member fastened to the mounting head of the locking member and having an outer diameter not larger than the annular bottom stop flange, and a metal panel member mounted with the mounting socket and attachable to an external metal panel member for enabling the locking member to lock the metal panel member to the external metal member. In installation, the mounting portion of the mounting socket is downwardly inserted into a mounting through hole of the metal panel member and temporarily positioned in the mounting through hole, and then a stamping process is applied to deform the inside wall of the mounting through hole of the metal panel member into a riveting portion and to simultaneously force the riveting portion thus produced into engagement with an annular mounting groove in a stepped flange of the mounting portion, causing the riveting portion to wrap about the outer surface of the stepped flange, and thus, the mounting portion and the riveting portion of the metal panel member are fixedly secured together and prohibited from relative displacement either vertically or horizontally. Thus, the metal panel member and the mounting socket are firmly secured together and prohibited from separation, enhancing the strength of the mounting portion of the mounting socket against a shearing force.

According to another aspect of the present invention, an elastic cushion member is mounted at the bottom enc of the locking end tip of the locking member for protection, preventing the locking member from damaging the surface of the metal panel member during operation. The elastic cushion member is preferably selected from the material group of elastic plastics, rubber and silicon rubber, and fastened to the bottom end of the expanded locking end tip of the locking member by one of riveting, tight fit, interference fit and adhesive bonding techniques.

Other and further benefits, advantages and features of the present invention will be understood by reference to the following specification in conjunction with the accompanying drawings, in which like reference characters denote like elements of structure.

DETAILED DESCRIPTION OF THE PREFERRED EMBODIMENT

Referring to FIGS. 1-4, an oblique top elevational view of a floating fastener mounting structure, an exploded view of the floating fastener mounting structure, another exploded view of the floating fastener mounting structure and a sectional side view of the floating fastener mounting structure are shown. The floating fastener mounting structure comprises a mounting socket 1, a locking member 2, a spring member 24, a cap member 3, and a metal panel member 4.

The mounting socket 1 is an open-ended cylindrical member comprising a center hole 10 vertically extending through opposing top and bottom sides thereof, an annular bottom stop flange 11 horizontally extended around the periphery thereof at the bottom side, a mounting portion 12 located at a bottom side of the annular bottom stop flange 11 around the center hole 10, and an annular inner top flange 13 located at a top side of the center hole 10 and defining a bottom abutment surface 131 and a center opening 130 in a concentric manner relative to the center hole 10. The mounting portion 12 comprises a stepped flange 121, an annular mounting groove 122 extended around the stepped flange 121, and a planar abutment surface 123 disposed at a top side of the annular mounting groove 122. The outer diameter D1 of the annular bottom stop flange 11 is larger than the outer diameter D2 of the part of the stepped flange 121 below the annular mounting groove 122.

The locking member 2 comprises a shank 22 inserted through the center hole 10 and center opening 130 of the mounting socket 1, a mounting head 21 located at a top end of the shank 22 and extended out of the top side of the mounting socket 1, an axle hole 210 transversely cut through the mounting head 21, a chamfered edge 211 located at a top end of the mounting head 21, a position-limit groove 212 extending around the periphery of the mounting head 21 and abutted to the shank 22, an expanded locking end tip 23 located at an opposing bottom end of the shank 22, and a bearing step 231 defined in a top side of the expanded locking end tip 23 around the bottom end of the shank 22. In this embodiment, the expanded locking end tip 23 is a cylindrical rod member. However, this design is simply an example but not intended for use as a limitation. In another embodiment of the present invention, the expanded locking end tip 23 can be configured to provide an outer thread or retaining flange.

The spring member 24 is mounted around the shank 22 of the locking member 2 and stopped between the bottom abutment surface 131 of the mounting socket 1 and the bearing step 231 of the locking member 2.

The cap member 3 comprises an accommodation chamber 30 for accommodating a part of the mounting socket 1 and a part of the locking member 2, a mating connection portion 31 located in a top side of the accommodation chamber 30 for securing the mounting head 21, a mounting hole 311 vertically cut through the center of the mating connection portion 31 in communication with the accommodation chamber 30, an engagement flange 312 located in the mating connection portion 31 and projecting into the mounting hole 311, a sloping guide surface 3121 located at a bottom side of the engagement flange 312, an operating portion 32 extending around the mating connection portion 31, and a plurality of arched grooves 321 located in and spaced around the operating portion 32. Further, the outer diameter D3 of the cap member 3 is not larger than (i.e., equal to or smaller than) the outer diameter D1 of the annular bottom stop flange 11.

The metal panel member 4 comprises at least one mounting through hole 40. The inner diameter d of the at least one mounting through hole 40 of the metal panel member 4 is smaller than the outer diameter D1 of the annular bottom stop flange 11 but larger than the outer diameter D2 of the part of the stepped flange 121 below the annular mounting groove 122.

During installation, sleeve the spring member 24 onto the shank 22 of the locking member 2, and then insert the mounting head 21 upwardly through the center hole 10 of the mounting socket 1 and the center opening 130 of the inner top flange 13 to let one end of the spring member 24 be stopped at the bottom abutment surface 131 of the inner top flange 13 and the other end of the spring member 24 be stopped at the bearing step 231 of the expanded locking end tip 23, and then insert the mounting head 21 upwardly into the accommodation chamber 30 of the cap member 3 and the mounting hole 311 of the mating connection portion 31 to abut to abut the chamfered edge 211 of the mounting head 21 against the sloping guide surface 3121 of the engagement flange 312, and then impart a downward pressure to the cap member 3 to force the engagement flange 312 against the chamfered edge 211 and to further elastically deform the engagement flange 312 and move the engagement flange 312 along the chamfered edge 211 over the mounting head 21 so that the engagement flange 312 can be engaged into the position-limit groove 212 after restoration to its original shape. At this time, the mounting head 21 is disposed outside the mounting hole 311 of the mating connection portion 31 and, the elastic restoring force of the spring member 24 is transferred to the bearing step 231 of the expanded locking end tip 23 to force the expanded locking end tip 23 out of the mounting portion 12 of the mounting socket 1. When the expanded locking end tip 23 is forced to move to the outside of the mounting portion 12 of the mounting socket 1, the cap member 3 is moved downwards with the mounting head 21 of the locking member 2 to stop at the mounting socket 1, and thus, the mounting socket 1, the locking member 2 and the cap member 3 are floatably fastened together. Further, the cap member 3 can be made from a plastic material in any desired color and shape, and configured to provide a pattern or mark. In actual application, the cap member 3 and the locking member 2 can be modularized for quick connection in a detachable manner, and respectively marked with a mark for installation alignment.

Figure 1:
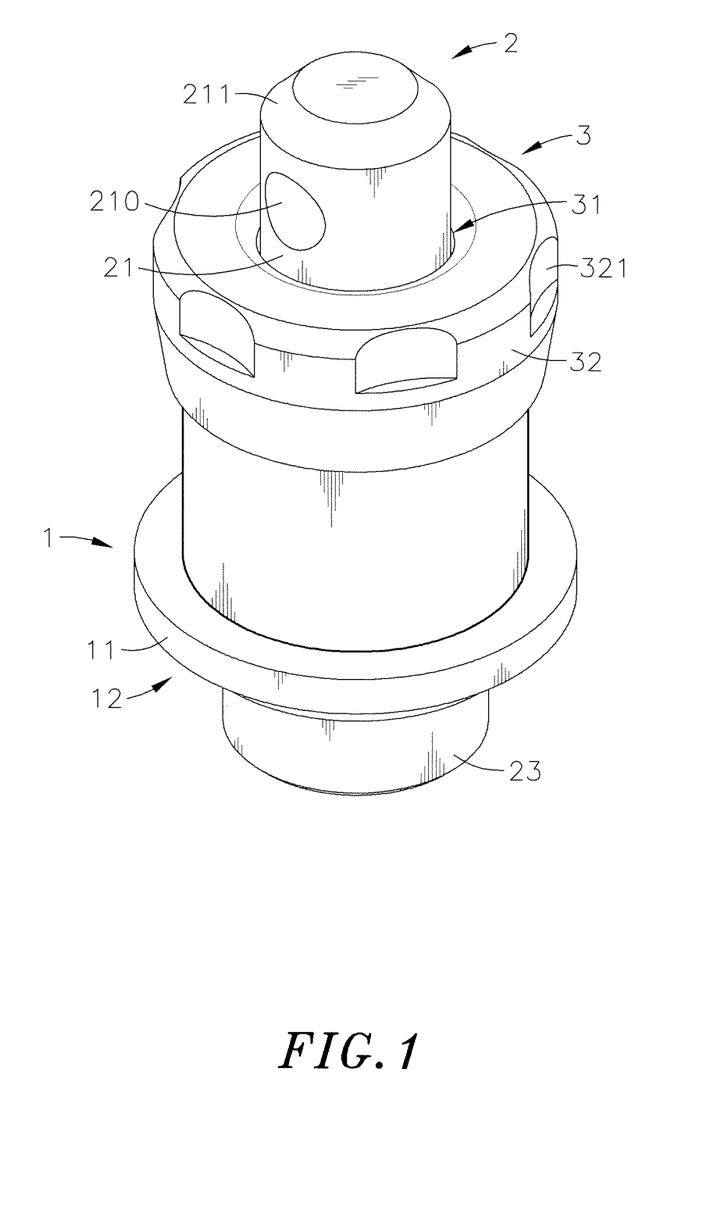
FIG. 1 is an oblique top elevational view of a floating fastener mounting structure in accordance with the present invention.
Figure 2:
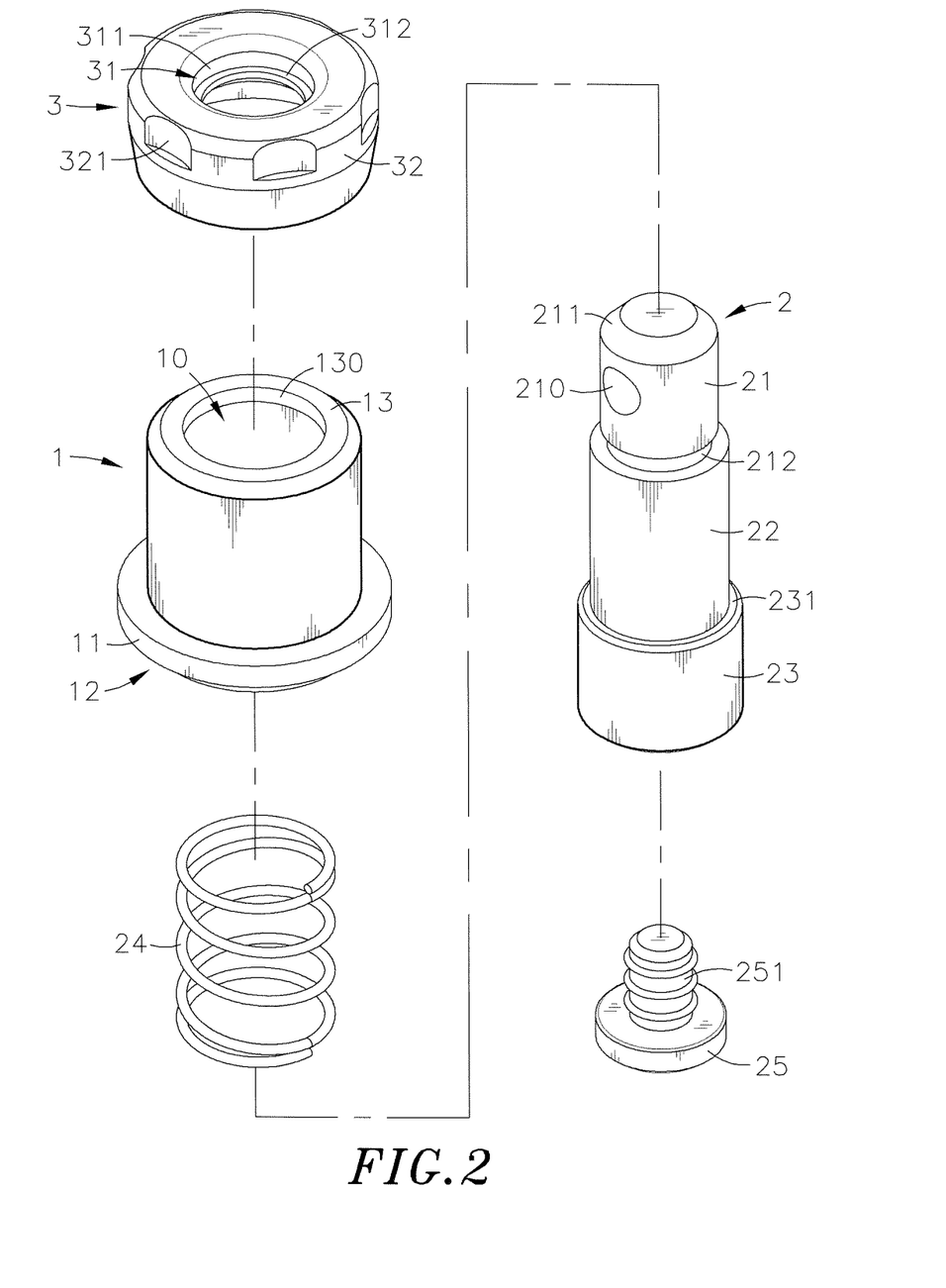
FIG. 2 is an exploded view of the floating fastener mounting structure in accordance with the present invention.
Figure 3:
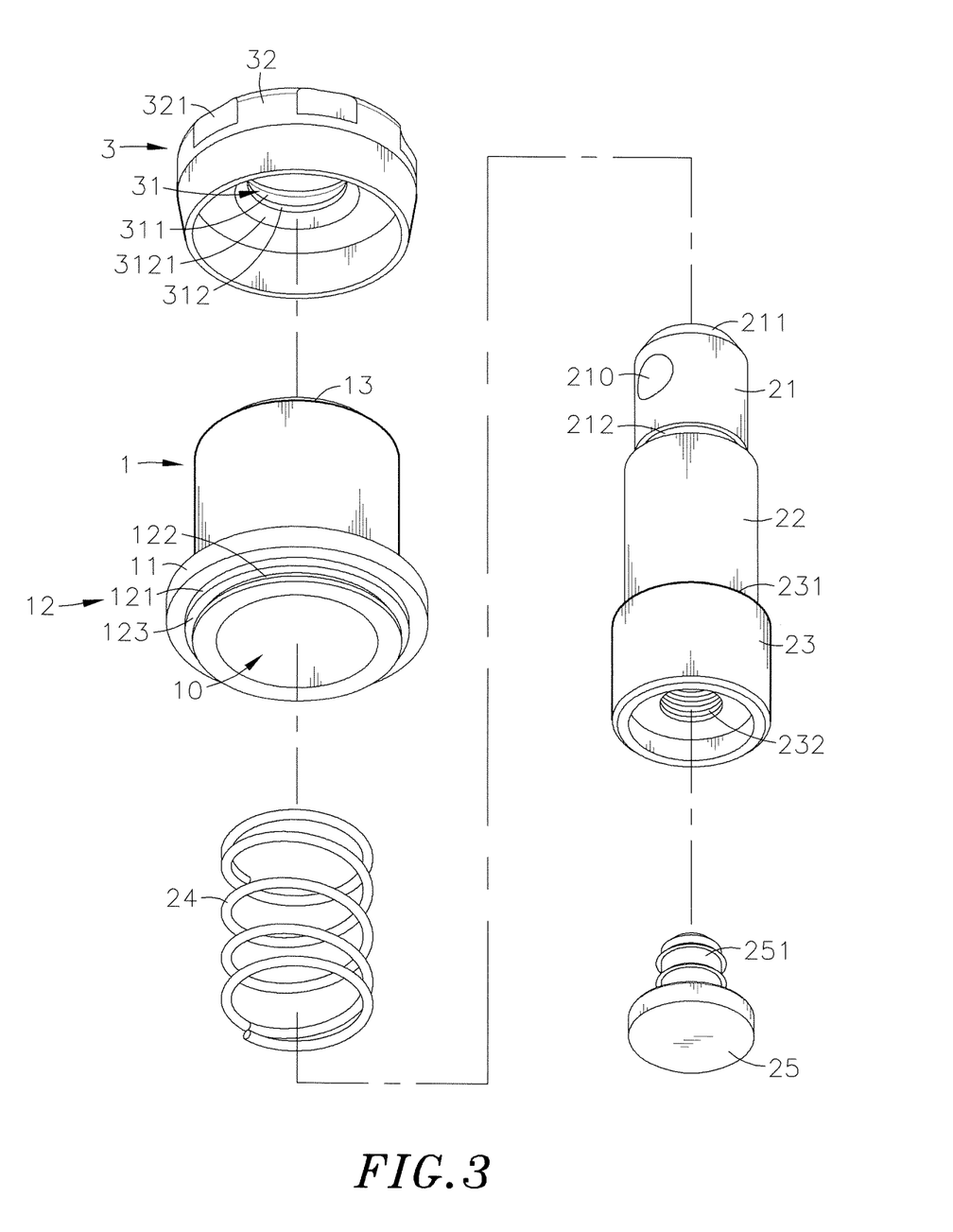
FIG. 3 corresponds to FIG. 2 when viewed from another angle.
Figure 4:
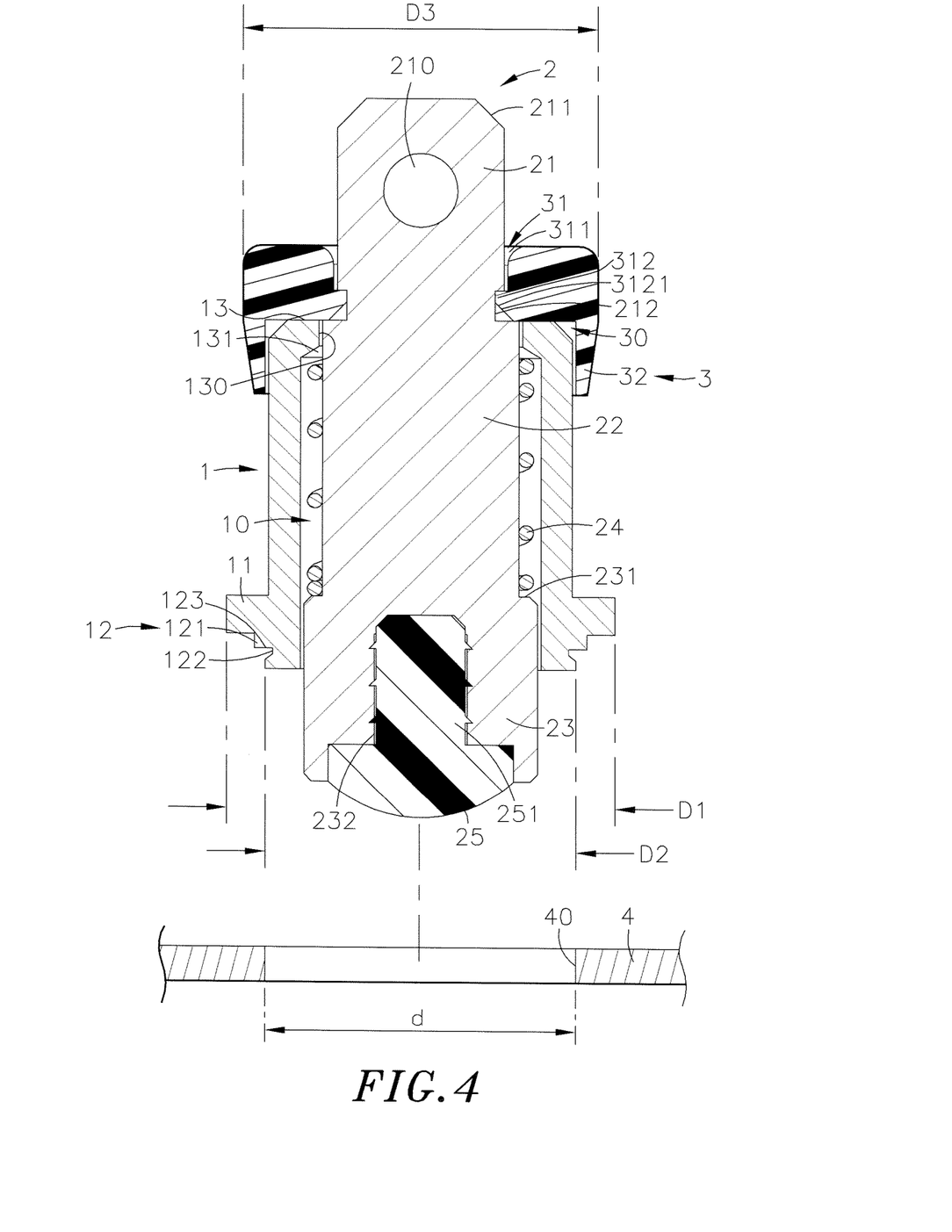
FIG. 4 is a sectional side view of the present invention, illustrating the mounting socket, the locking member, the spring member and the cap member assembled before installation in the metal panel member.

Preferably, the locking member 2 further comprises an elastic cushion member 25 located at a bottom end of the expanded locking end tip 23. The elastic cushion member 25 can be made from elastic plastics, rubber or silicon rubber. In the present preferred embodiment, the expanded locking end tip 23 is configured to provide a bottom screw hole 232; the elastic cushion member 25 is configured to provide a top screw rod 251. By means of threading the top screw rod 251 of the elastic cushion member 25 into the bottom screw hole 232 of the expanded locking end tip 23, the elastic cushion member 25 is fastened to the expanded locking end tip 23 and abutted against the bottom edge thereof. Further, the elastic cushion member 25 can be fastened to the bottom end of the expanded locking end tip 23 by riveting, tight fit, interference fit, or adhesive bonding.

Referring to FIGS. 2 and 5-10, when mounting the mounting socket 1 in the metal panel member 4, insert the mounting socket 1 downwardly into the mounting through hole 40 of the metal panel member 4. Because the outer diameter D1 of the annular bottom stop flange 11 of the mounting socket 1 is larger than the inner diameter d of the mounting through hole 40 and the outer diameter D2 of the part of the stepped flange 121 of the mounting portion 12 below the annular mounting groove 122 is slightly smaller than the inner diameter d of the mounting through hole 40, the part of the mounting portion 12 below the annular mounting groove 122 can be inserted into the mounting through hole 40 of the metal panel member 4 with the planar abutment surface 123 stopped at a top surface of the metal panel member 4 around the mounting through hole 40 to temporarily secure the mounting socket 1 to the metal panel member 4. Thereafter, place the mounting socket 1 with the metal panel member 4 on a work table 5 of a stamping press for stamping.

Figure 5:
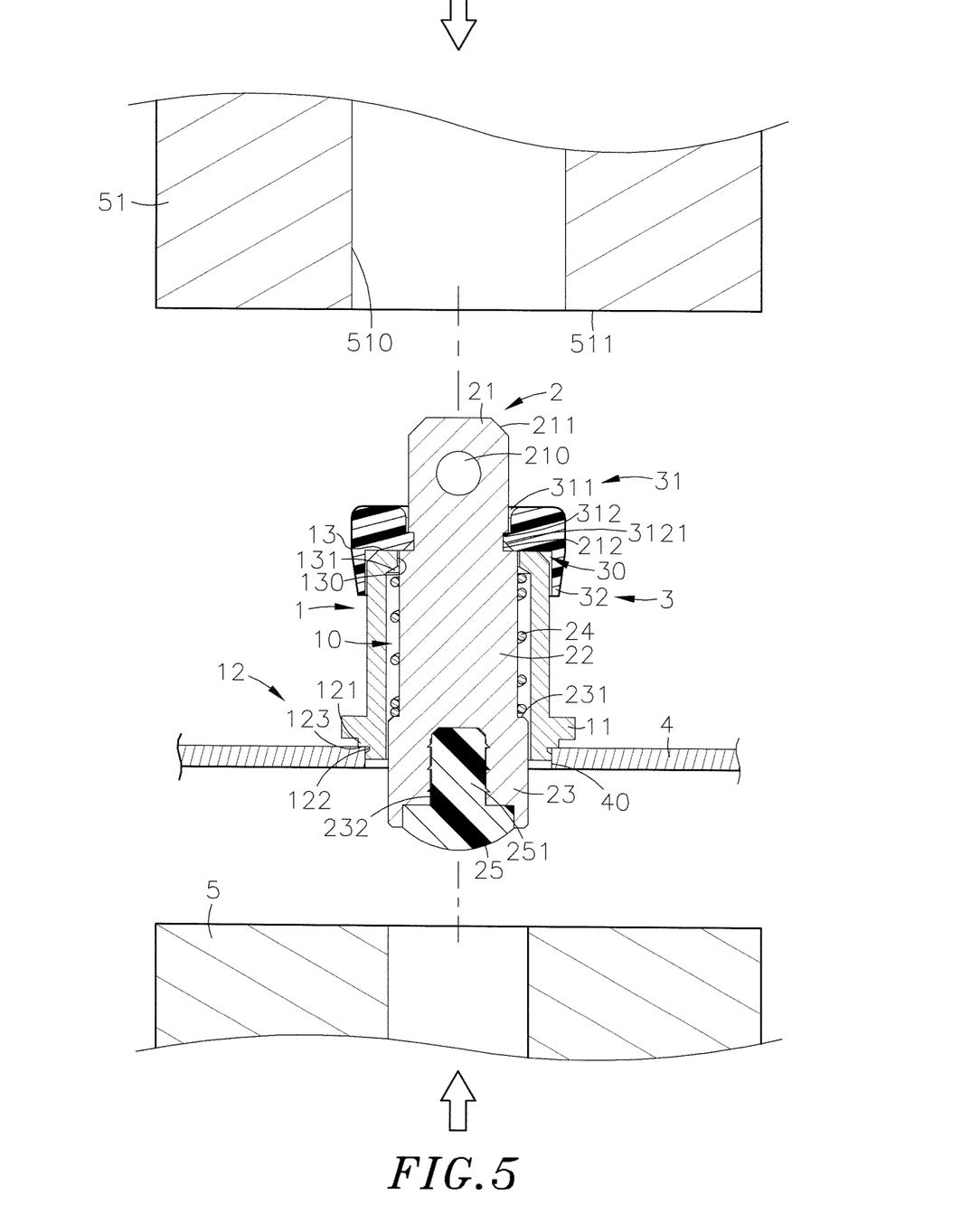
FIG. 5 is a schematic sectional view illustrating the riveting process of the floating fastener mounting structure in accordance with the present invention in a stamping press (I).
Figure 6:
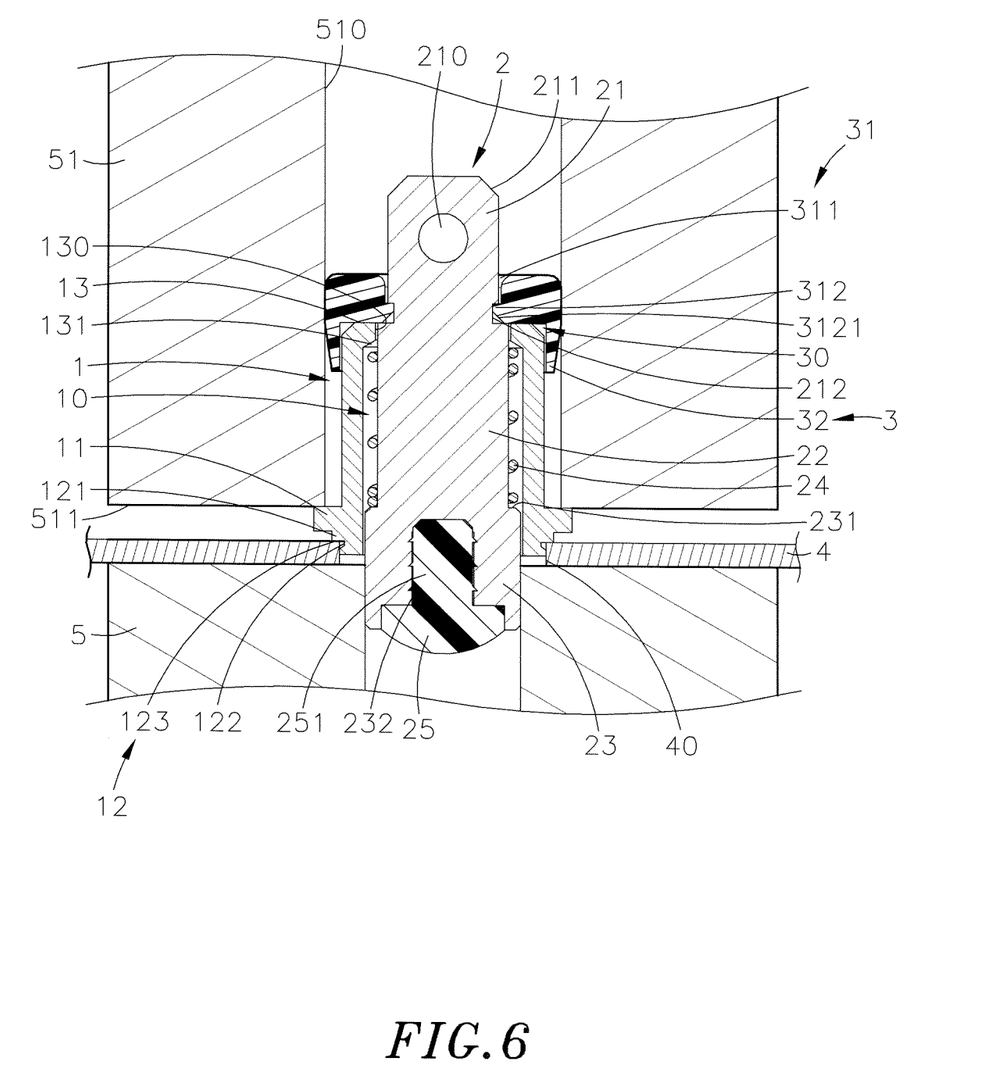
FIG. 6 is a schematic sectional view illustrating the riveting process of the floating fastener mounting structure in accordance with the present invention in a stamping press (II)
Figure 7:
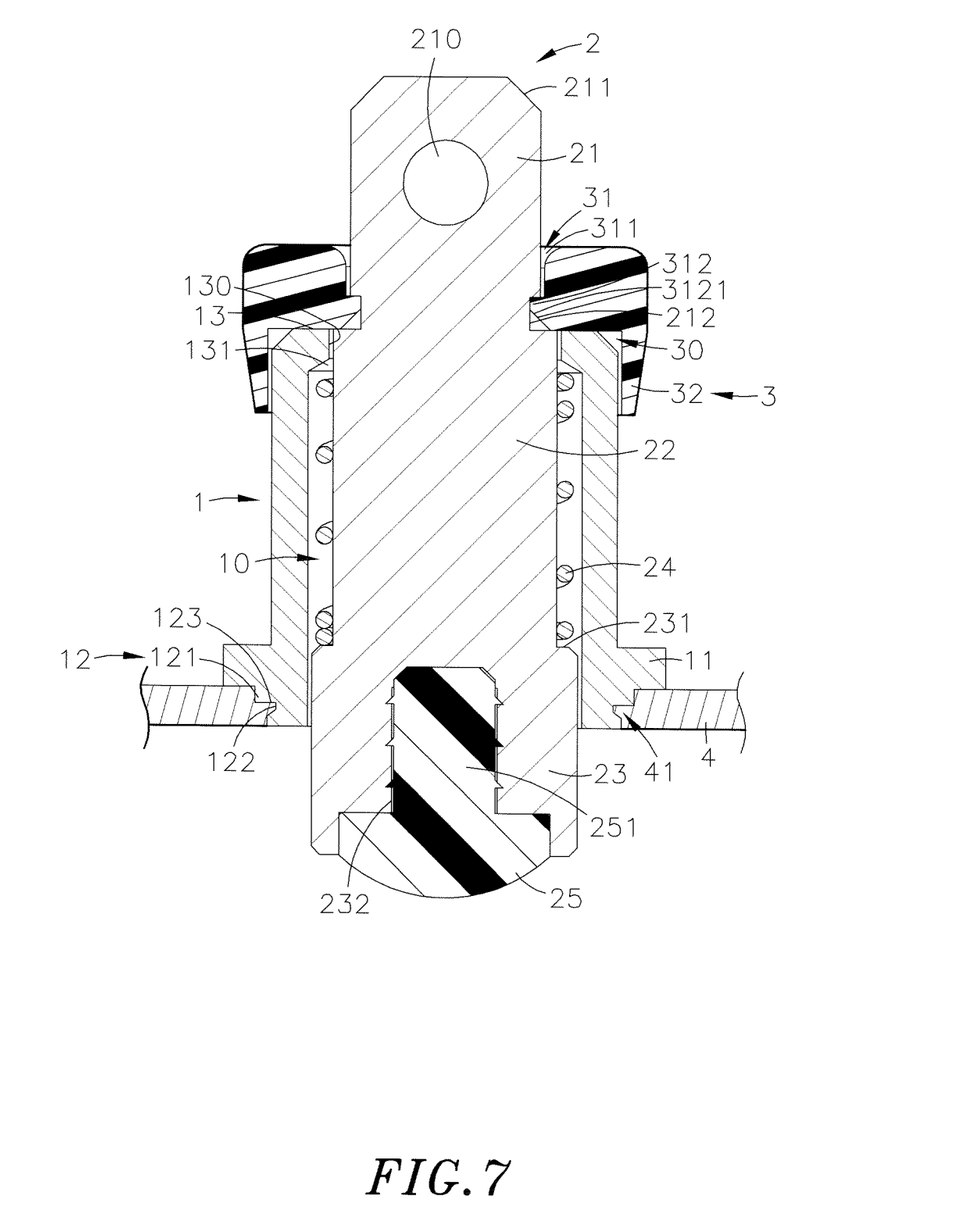
FIG. 7 is a sectional assembly view of the floating fastener mounting structure in accordance with the present invention.

In the stamping process to affix the mounting socket 1 and the metal panel member 4 together, attach a negative mold cavity 510 of a stamping die 51 to the annular bottom stop flange 11 of the mounting socket 1 and the cap member 3 to abut a front planar die surface 511 of the stamping die 51 around the negative mold cavity 510 a top surface of the annular bottom stop flange 11 of the mounting socket 1, and then operate the stamping press to stamp the negative mold cavity 510 of the stamping die 51 onto the mounting socket 1 and the cap member 3, causing the front planar die surface 511 of the stamping die 51 around the negative mold cavity 510 to deform a part of the metal panel member 4 around the mounting through hole 40 into a riveting portion 41 and to simultaneously force the riveting portion 41 thus formed into engagement with the annular mounting groove 122 around the stepped flange 121 of the mounting portion 12 of the mounting socket 1, and thus, the riveting portion 41 is stopped by the planar abutment surface 123 from vertical displacement. At this time, the deformed riveting portion 41 of the metal panel member 4 is wrapped about the stepped flange 121 of the mounting socket 1 to prohibit the mounting socket 1 from horizontal displacement relative to the metal panel member 4. Thus, the stepped flange 121 and planar abutment surface 123 of the mounting portion 12 of the mounting socket 1 are tightly abutted against the riveting portion 41 of the metal panel member 4 and the riveting portion 41 is tightly kept in engagement with the annular mounting groove 122, enhancing the structural strength of the connection between the mounting socket 1 and the mounting through hole 40 of the metal panel member 4. Further, the stepped flange 121 and annular mounting groove 122 of the mounting portion 12 are retained by the riveting portion 41 of the metal panel member 4, achieving a double position limiting effect. Further, because the outer diameter D1 of the annular bottom stop flange 11 is larger than the outer diameter D2 of the part of the stepped flange 121 of the mounting portion 12 below the annular mounting groove 122, the metal panel member 4 and the mounting socket 1 are firmly secured together and prohibited from separation. Even if the mounting socket 1 is pulled or forced by the locking member 2, the cap member 3 or any other external force, the mounting socket 1 will not fall out of the metal panel member 4, assuring a high level of structural stability and shear strength.

Figure 8:
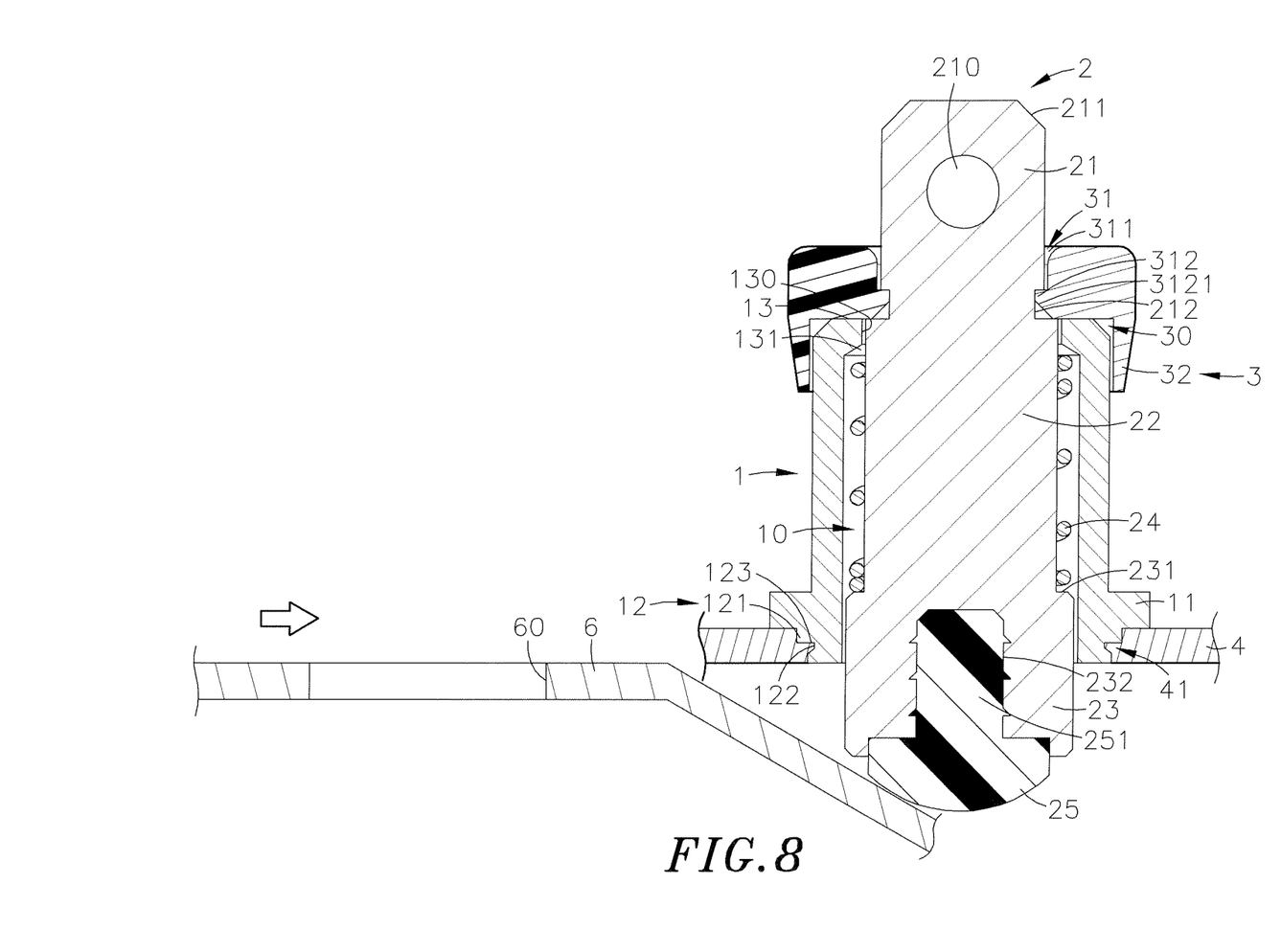
FIG. 8 is schematic sectional applied view of the present invention, illustrating the installation of the floating fastener mounting structure view in an external metal panel member (I).
Figure 9:
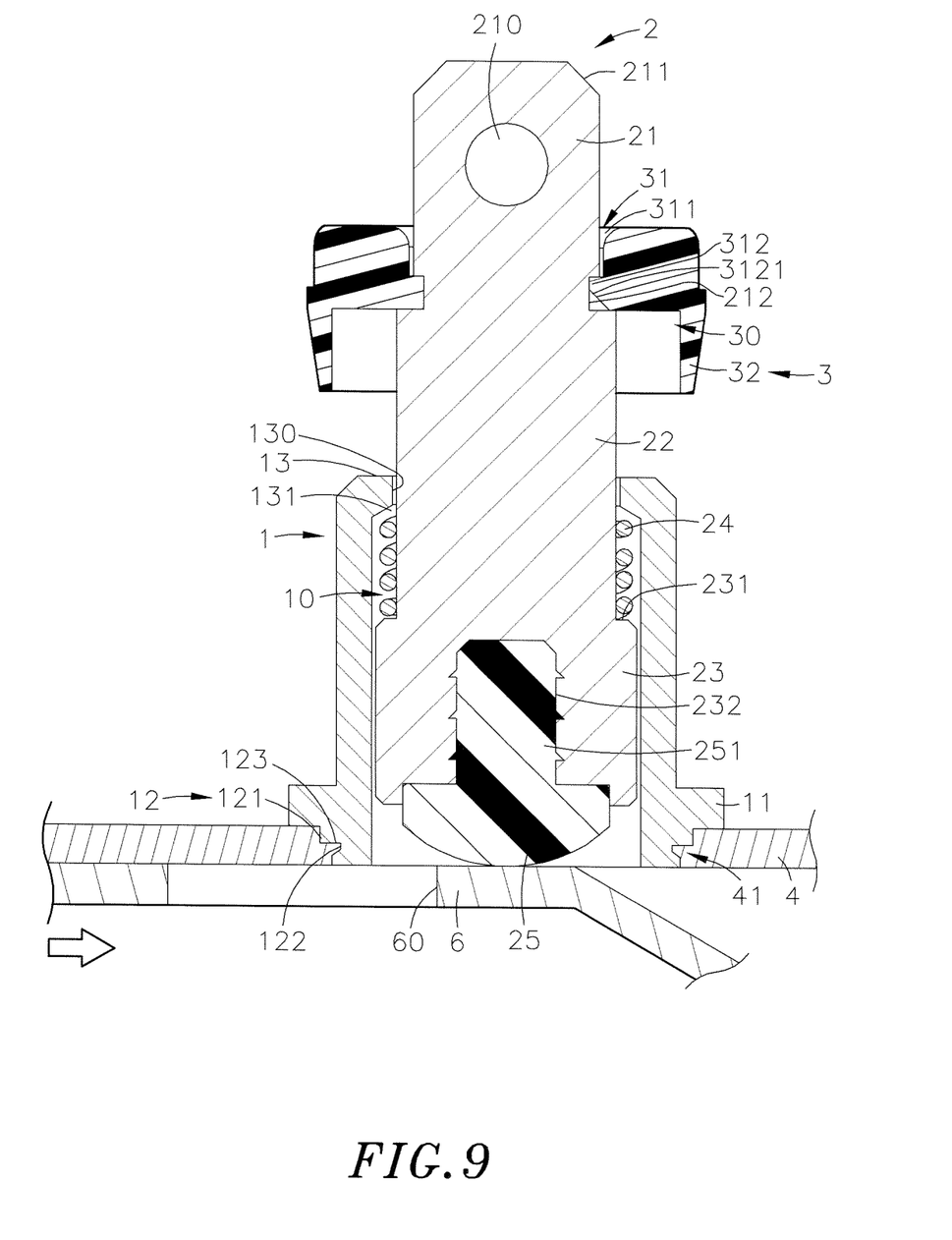
FIG. 9 is schematic sectional applied view of the present invention, illustrating the installation of the floating fastener mounting structure view in an external metal panel member (II).
Figure 10:
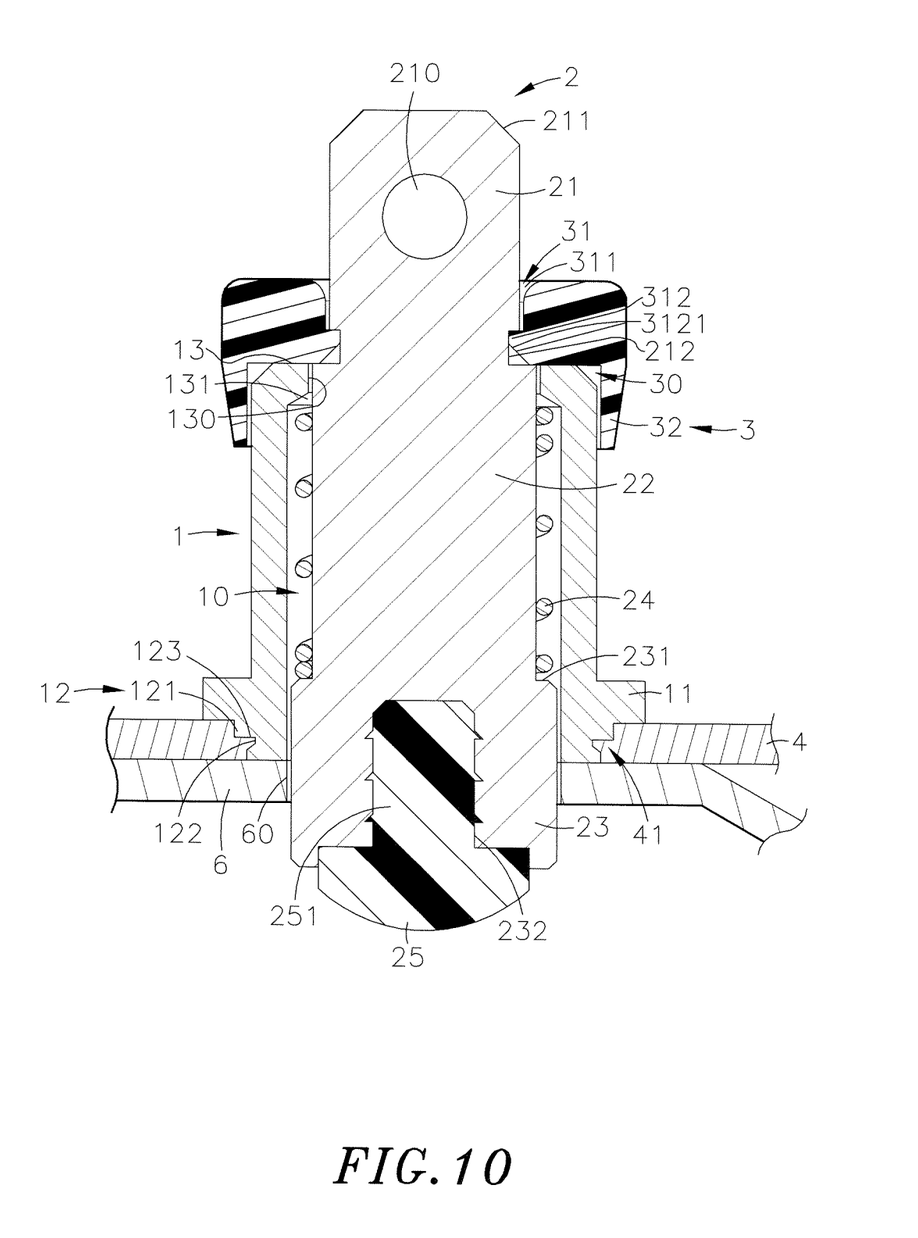
FIG. 10 is schematic sectional applied view of the present invention, illustrating the installation of the floating fastener mounting structure view in an external metal panel member (III).

Further, by means of the arched grooves 321 in the operating portion 32 of the cap member 3, the cap member 3 can be conveniently and positively pulled to lift the locking member 2, retracting the expanded locking end tip 23 out of the mounting through hole 40 of the metal panel member 4 into the inside of the center hole 10 of the mounting socket 1 and forcing the bearing step 231 of the expanded locking end tip 23 to compress the spring member 24. Alternatively, a screwdriver, tube or rod member can be inserted through the axle hole 210 of the mounting head 21 of the locking member 2 above the cap member 3, and then pulled upwards to lift the locking member 2 and the cap member 3, retracting the expanded locking end tip 23 out of the mounting through hole 40 of the metal panel member 4 into the inside of the center hole 10 of the mounting socket 1. Thereafter, release the operating portion 32 of the cap member 3 or the mounting head 21, enabling the elastic potential energy of the spring member 24 to force the expanded locking end tip 23 downwardly out of the mounting through hole 40 of the metal panel member 4. When wishing to lock the metal panel member 4 to an external metal panel member 6, attach the external metal panel member 6 to the bottom surface of the metal panel member 4 and then move the external metal panel member 6 transversely along the bottom surface of the metal panel member 4 to abut a top surface of the external metal panel member 6 against the elastic cushion member 25 and to force the locking member 2 upward, causing the locking member 2 to retract into the mounting through hole 40 of the metal panel member 4 and the center hole 10 of the mounting socket 1. At the same time, the bearing step 231 of the expanded locking end tip 23 is upwardly forced to compress the spring member 24. When the external metal panel member 6 is transversely moved to the position where a locking hole 60 of the external metal panel member 6 is kept in vertical alignment with the mounting through hole 40 of the metal panel member 4 and the expanded locking end tip 23 of the locking member 2, the spring member 24 is released from the constraint to force the expanded locking end tip 23 of the locking member 2 downwardly into the locking hole 60 of the external metal panel member 6, locking the external metal panel member 6 to the metal panel member 4. As stated above, when moving the external metal panel member 6 transversely along the bottom surface of the metal panel member 4 during the locking operation, the top surface of the external metal panel member 6 will be forced to abut against the elastic cushion member 25. At this time, the elastic cushion member 25 provides a buffer effect to prevent direct friction between the expanded locking end tip 23 and the external metal panel member 6, and thus, the expanded locking end tip 23 is prohibited from damaging the surface of the metal panel member 6 during installation. Further, when wishing to separate the metal panel member 4 from the external metal panel member 6, pull the cap member 3 or the mounting head 21 to disengage the expanded locking end tip 23 of the locking member 2 from the locking hole 60 of the external metal panel member 6, allowing removal of the metal panel member 4 from the external metal panel member 6.

In conclusion, the invention provides a floating fastener mounting structure, which comprises a mounting socket 1 that comprises a center hole 10, an annular bottom stop flange 11 and a mounting portion 12 located at a bottom side of the annular bottom stop flange 11 around center hole 10, a locking member 2 that comprises a shank 22 inserted through the center hole 10 of the mounting socket 1, a mounting head 21 axially upwardly extended from a top end of the shank 22 and suspending above the mounting socket 1 and an expanded locking end tip 23 axially downwardly extended from an opposing bottom end of the shank 22, a spring member 24 mounted around the shank 22 and stopped between a part of the mounting socket 1 and a part of the locking member 2, a cap member 3 fastened to the mounting head 21 of the locking member 2 and having an outer diameter not larger than the annular bottom stop flange 11, and a metal panel member 4 mounted with the mounting socket 1 and attachable to an external metal panel member for enabling the locking member 3 to lock the metal panel member 4 to the external metal member. In installation, the mounting portion 12 of the mounting socket 1 is downwardly inserted into a mounting through hole 40 of the metal panel member 4 and temporarily positioned in the mounting through hole 40, and then a stamping process is applied to deform the inside wall of the mounting through hole 40 of the metal panel member 4 into a riveting portion 41 and to simultaneously force the riveting portion 41 thus produced into engagement with an annular mounting groove 122 in a stepped flange 121 of the mounting portion 12, causing the riveting portion 41 to wrap about the outer surface of the stepped flange 121, and thus, the mounting portion 12 and the riveting portion 41 of the metal panel member 4 are fixedly secured together and prohibited from relative displacement either vertically or horizontally. Thus, the metal panel member 4 and the mounting socket 1 are firmly secured together and prohibited from separation. Even if the mounting socket 1 is pulled or forced by an external force, the mounting socket 1 will not fall out of the metal panel member 4, assuring a high level of structural stability and shear strength.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A floating fastener mounting structure, comprising a metal panel member, a mounting socket affixed to said metal panel member, a locking member mounted in said mounting socket and insertable into a locking hole in an external metal panel member to lock said metal panel member to said external metal panel member, and a spring member mounted in said mounting socket to floatably support said locking member in said mounting socket, wherein:

said mounting socket comprises a center hole vertically extending through opposing to and bottom sides thereof, an annular bottom stop flange extending the periphery thereof at the bottom side, and a mounting portion located at a bottom side of said annular bottom stop flange around said center hole;

said locking member comprises a shank inserted through said center hole of said mounting socket, a mounting head located at a top end of said shank and disposed above said mounting socket, an expanded locking end tip located at an opposing bottom end of said shank;

said spring member mounted around said shank of said locking member and stopped between a part of said mounting socket and a part of said locking member and compressible upon axial movement of said locking member relative to said mounting socket;

a cap member is fastened to said mounting head of said locking member for enabling a part of said mounting head of said locking member to be disposed above said cap member, said cap member comprising an accommodation chamber adapted for accommodating a part of said mounting socket and a part of said mounting head of said locking member, the outer diameter of said cap member being equal to or smaller than the outer diameter of said annular bottom stop flange;

wherein said locking member further comprises a position-limit groove extended around the periphery of said mounting head and abutted to said shank; said cap member further comprises a mating connection portion located in a top side of said accommodation chamber for securing said mounting head of said locking member, a mounting hole vertically cut through the center of said mating connection portion in communication with said accommodation chamber for enabling a part said mounting head of said locking member to extend to the outside of said cap member, and an engagement flange located in said mating connection portion and projecting into said mounting hole and engaged into said position-limit groove of said locking member.

2. The floating fastener mounting structure as claimed in claim 1, wherein said metal panel member comprises a riveting portion located in said mounting through hole; said mounting portion of said mounting socket comprises a stepped flange abutted against said riveting portion of said metal panel member to prohibit said mounting socket from horizontal displacement relative to said metal panel member, and a planar abutment surface located at said stepped flange and abutted against said riveting portion of said metal panel member to prohibit said mounting socket from vertical displacement relative to said metal panel member.

3. The floating fastener mounting structure as claimed in claim 1, wherein said mounting socket further comprises an annular inner top flange located at a top side of said center hole and defining a bottom abutment surface for stopping against a top end of said spring member and a center opening in a concentric manner relative to said center hole for the passing of said mounting head of said locking member.

4. The floating fastener mounting structure as claimed in claim 1, wherein said locking member further comprises a bearing step defined in a top side of said expanded locking end tip around a bottom end of said shank for stopping against a bottom end of said spring member, and an elastic cushion member mounted at a bottom end of said expanded locking end tip.

5. The floating fastener mounting structure as claimed in claim 4, wherein said elastic cushion member is selected from the material group of elastic plastics, rubber and silicon rubber, and fastened to the bottom end of said expanded locking end tip of said locking member by one of riveting, tight fit, interference fit and adhesive bonding techniques.

6. The floating fastener mounting structure as claimed in claim 1, wherein said locking member further comprises an axle hole transversely cut through said mounting head.

7. The floating fastener mounting structure as claimed in claim 1, wherein said cap member further comprises an operating portion located at a top side thereof around said accommodation chamber, and a plurality of arched grooves located in and spaced around said operating portion.

8. The floating fastener mounting structure as claimed in claim 1, wherein said mounting portion of said mounting socket is downwardly inserted into said mounting through hole of said metal panel member and then positioned therein; the peripheral wall of said mounting through hole of said metal panel member is stamped and deformed to form a riveting portion that is forced into engagement with said mounting portion tightly to affix said mounting socket to said metal panel member.

* * * * *